UNITED STATES PATENT OFFICE.

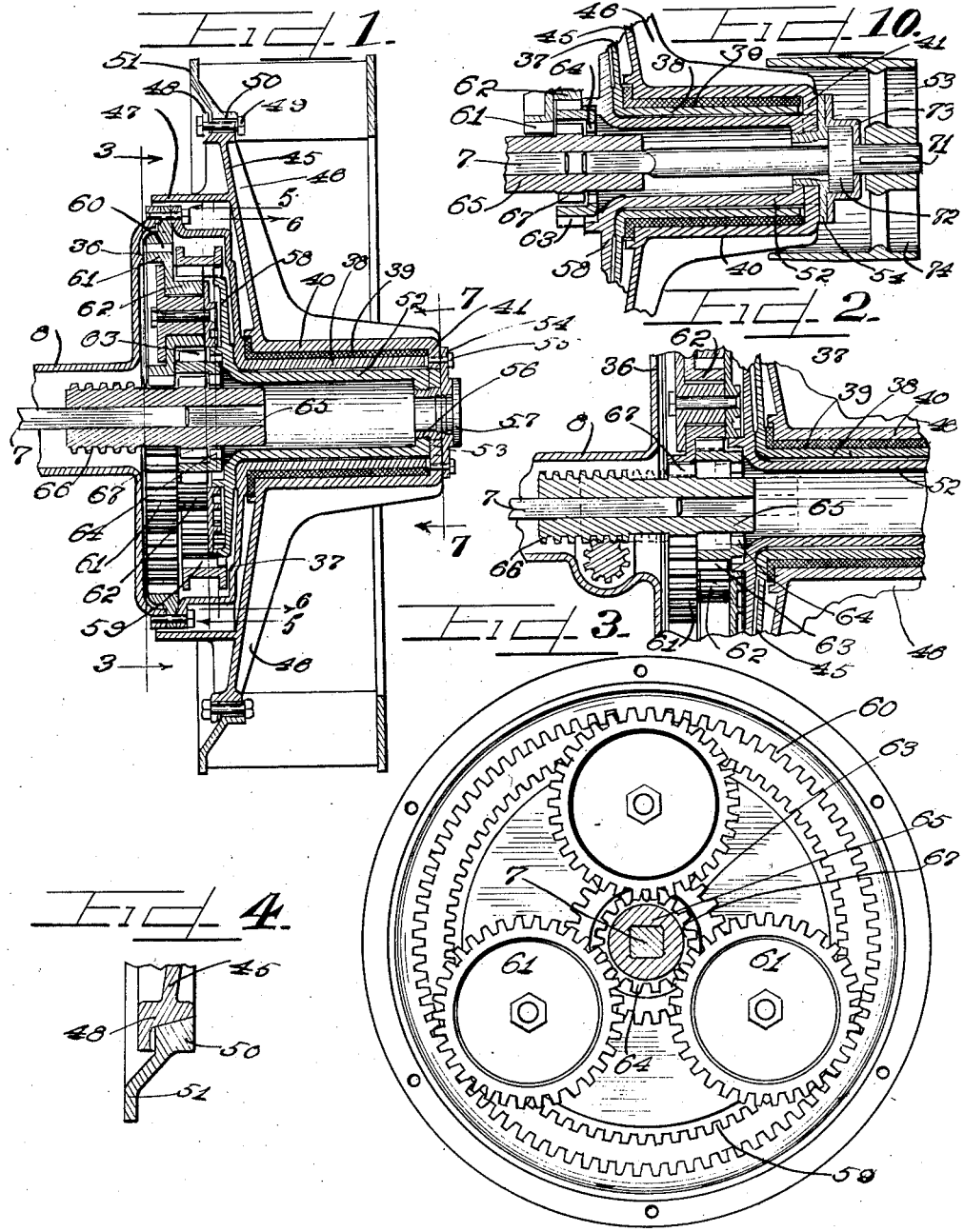

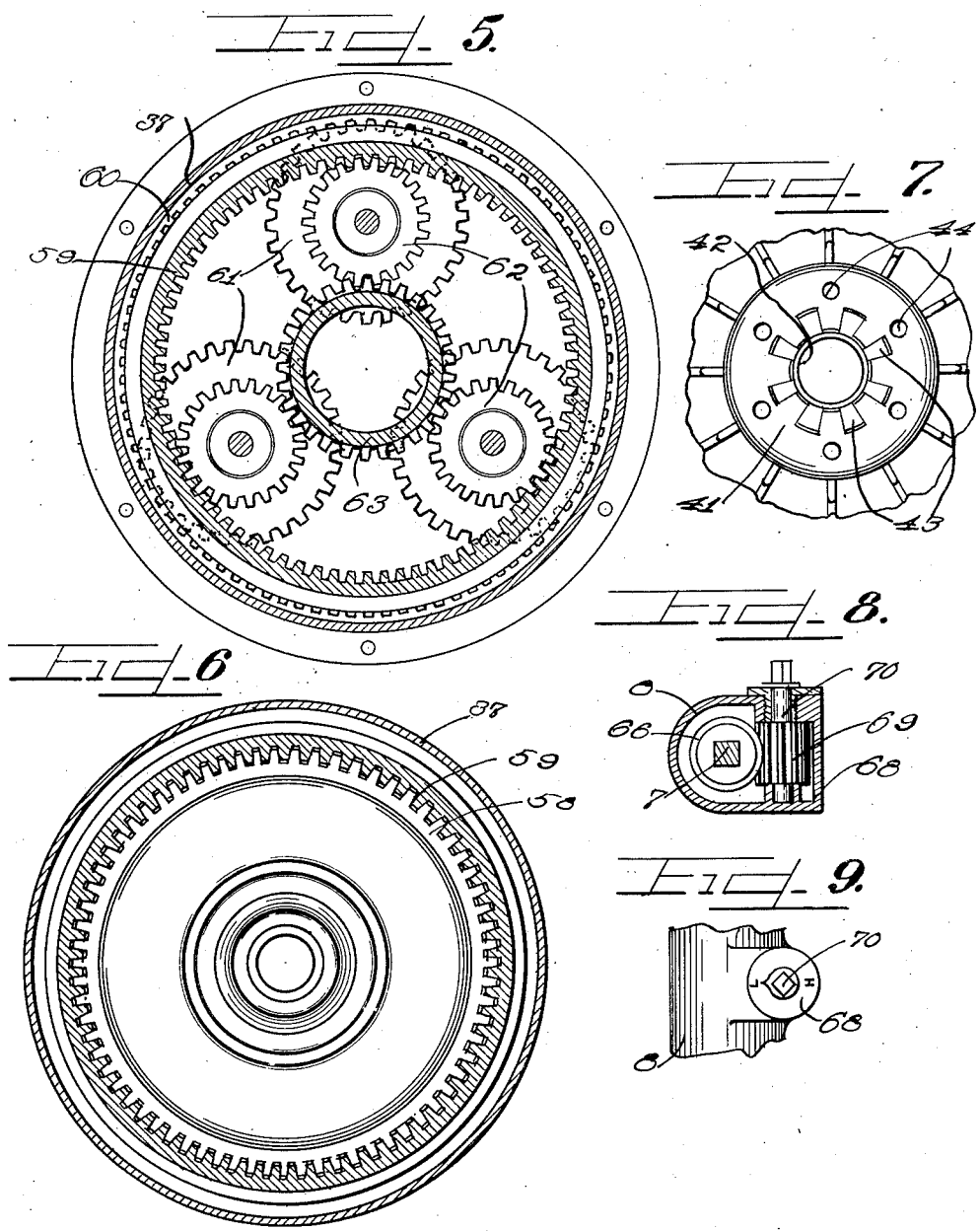

ALBERT E. COOK, OF EVANSTON, AND THOMAS VAN TUYL, OF KANKAKEE, ILLINOIS; SAID VAN TUYL ASSIGNOR TO SAID COOK.

SPEED-CHANGE TRACTOR ATTACHMENT FOR AUTOMOBILES.

1,417,798.　　　　Specification of Letters Patent.　　Patented May 30, 1922.

Application filed June 14, 1918. Serial No. 240,099.

*To all whom it may concern:*

Be it known that we, ALBERT E. COOK and THOMAS VAN TUYL, citizens of the United States, and residents of the city of Evanston, in the county of Cook and State of Illinois, and of the city of Kankakee, in the county of Kankakee and State of Illinois, respectively, have invented certain new and useful Improvements in a Speed-Change Tractor Attachment for Automobiles; and we do hereby declare that the following is a full, clear, and exact description of the same, reference being had to the accompanying drawings, and to the numerals of reference marked thereon, which form a part of this specification.

This invention relates to an improved form of speed change mechanism adaptable for use on a vehicle or on a machine to afford a means for driving the same at a rate of speed different from that transmitted thereto.

It is an object of this invention to provide mechanisms adapted to be connected with the rear axles of a motor driven vehicle to afford a means for driving the vehicle at different reduced rates of speed.

It is also an object of the invention to provide speed change wheels for a motor driven vehicle, whereby a drive transmitted thereto is reduced.

Another object of the invention is the construction of a speed change mechanism adapted to effect a plurality of different speed reductions of a drive transmitted thereto.

It is a further object of this invention to construct a tractor driving wheel provided with a shifting gear mechanism adapted to permit the wheel to be driven at different reduced rates of speed over that transmitted to said wheel, depending upon the shifted position of said mechanism.

Another object of the invention is the construction of a wheel provided with speed change mechanisms adapted to be driven at different rates of speed from that transmitted by a driving axle of an automobile, said different rates of speed being obtained by means of shifting a geared driving sleeve.

It is furthermore an object of this invention to construct a vehicle speed change wheel adapted to be adjusted from the exterior to cause said wheel to rotate at a changed rate of speed.

It is an important object of the invention to construct a speed change tractor wheel provided with externally actuable means for causing said wheel to be rotated at a rate of speed different from that of a driving axle on which the wheel is mounted.

Another object of the invention is the construction of a speed change mechanism adapted to transmit a drive to a belt mechanism removably attached thereto.

It is also an object of this invention to produce a speed change mechanism provided with a shiftable driving member for effecting different speed reductions, and adapted when moved into a neutral position to transmit a drive to a pulley attachment removably connected with said driving member.

Other and further important objects of this invention will be apparent from the disclosures in the drawings and specification.

The invention (in a preferred form) is illustrated in the drawings and hereinafter more fully described.

On the drawings:—

Figure 1 is a diametrical section through a speed change wheel mechanism embodying the principles of this invention.

Figure 2 is a fragmentary section of the speed change mechanism of the wheel showing the parts in shifted position.

Figure 3 is an enlarged section taken on line 3—3 of Figure 1, with parts omitted.

Figure 4 is an enlarged fragmentary detail section through the wheel rim.

Figure 5 is an enlarged section taken on line 5—5 of Figure 1.

Figure 6 is an enlarged section taken on line 6—6 of Figure 1.

Figure 7 is a view taken on line 7—7, of Figure 1, with parts omitted.

Figure 8 is an enlarged detail section taken through the rack and pinion mechanism.

Figure 9 is a fragmentary top plan view thereof.

Figure 10 is a detail section similar to that shown in Figure 2, covering a modified use of the device.

As shown on the drawings:—

Rear driving axles 7, are disposed within a rear axle sleeve 8. Said axles 7, have the inner ends thereof connected to an automobile differential not shown.

A flanged closure plate 36, is integrally formed on each end of the rear axle sleeve 8, and forms the inner portion of a non-leaking dust-proof stationary gear casing the outer portion of which comprises a flanged outer casing portion or section 37, having integrally formed thereon an outwardly directed stationary hub 38, having a bearing sleeve 39, mounted thereon. Rotatably mounted upon the bearing sleeve 39, is an outer or movable wheel hub 40, the outer end of which is closed by means of an integral end plate 41, provided with a central opening 42, and a plurality of radially directed apertures 43. Said end plate 41, is also provided with a plurality of small openings 44, as clearly shown in Figure 7. Integrally formed on the inner end of the hub 40, is a dished wheel plate 45, which is re-inforced by ribs 46, integrally formed on the outer surface of said wheel plate and on the wheel hub 40. Integrally formed on the inner surface of the wheel plate 45, is a drum 47, which encloses the rear casing. The peripheral margin of the wheel plate 45, is provided with an integral angle cross-sectioned rim 48, having apertures therein to receive locking bolts 49, which project through suitable openings provided for the purpose in the inner flange 50, of a wheel rim 51.

Disposed within the stationary hub 38, is a cylindrical tube 52, the outer end of which is provided with a plurality of integral projections or teeth 53, which project into the openings 43, of the end plate 41, to lock the tube 52, with the wheel hub 40. The wheel hub has the outer end closed by means of a cap embracing an apertured plate or disk 54, which is secured to the end plate by means of bolts 55, which project through the apertures 44, of said end plate and through the apertures in the disk 54. The disk 54, is provided with an integral externally threaded sleeve 56, which threads into the tube 52. Removably threaded into the disk 54, and the sleeve 56, thereof is a plug 57. Integrally formed on the inner end of the tube 52, is a large gear wheel 58, which meshes or engages in the teeth of an internal gear ring 59, mounted within the gear casing, and yieldably or slightly adjustable diametrically within said gear wheel. Rigidly secured between the flanges of the gear casing sections 36 and 37, is a stationary internal gear 60, which is larger than the movable internal gear 59, and is disposed adjacent thereto. A plurality of compound compensating floating double gear members are positioned within the gear casing and each consists of a large gear 61, and a small gear 62, integral therewith. The large gears 61, are in mesh with the stationary internal gear 60, while the small gears 62, mesh with the movable internal gear 59. Also meshing with the small gears 62, is a driving gear 63, having integrally formed therein an internal driving gear 64, which is axially aligned with the driving axle 7. Slidably or shiftably mounted upon the outer end of each of the driving axles 7, is a driving cylinder comprising a shiftable sleeve or collar 65, having integrally formed on the inner end thereof a cylindrical rack 66. Also integrally formed on the sleeve 65, between the ends thereof is a driving gear 67, which in neutral position as shown in Figure 1, is disposed within the driving gear 63, between the internal driving gear 64, and the large gears 61, and out of mesh therewith. The driving cylinder is provided with a squared passage to permit the same to be rotated by the driving axle 7. Said driving cylinder as shown in Figure 1, projects into the axle sleeve 8, and into the tube 52, of the wheel.

Integrally formed on the rear side and near each end of the axle sleeve 8, is a small housing or box 68, having mounted therein a pinion 69, secured upon a vertical stub shaft 70, rotatably journalled in said box and extending upwardly therethrough with the upper end thereof squared to receive a wrench or tool for turning said pinion 69. The pinion 69, is in mesh with the cylindrical rack 66, and rotation of said pinion causes the driving cylinder to slide inwardly or outwardly on the driving axle 7, depending upon the direction of rotation of said pinion. The sliding of the driving cylinder moves the driving gear 67, from neutral position into meshing engagement with the gears 61, or the internal driving gear 64, to cause a drive from the axle 7, to be transmitted to the wheel rim at different reduced rates of speed.

The device, as shown in Figure 10, discloses a modified use of the device in which the construction of the wheel is the same as that already described. In this case, however, the plug 57, is removed and an auxiliary axle 71, has the inner squared end thereof engaged in the outer end of the driving cylinder 65. The auxiliary shaft 71, has a bearing member 72, mounted thereon to limit the inward movement of said auxiliary shaft and afford a suitable bearing therefor. A cap 73, engaged on said auxiliary shaft is rigidly secured to the disk 54, thereby holding the auxiliary shaft in position. Keyed or otherwise secured on the extending end of the auxiliary shaft 71, is a pulley 74. With this construction, it will be seen that a pulley 74, may be driven by the automobile motor when the speed change tractor wheels are stationary or when they are in operation.

The operation is as follows:—

The rotation of a driving axle 7, simultaneously rotates the slidable driving cylinder 65, which, as shown in Figure 1, is in neutral position with the gear 67, thereof out of engagement with the gears 61, and the internal driving gear 64. No drive is therefor transmitted to the wheel. If it is now desired to have the drive from the axle 7, transmitted to the wheel at a reduced rate of speed, a wrench or other tool is engaged on the projecting squared end of the respective vertical shaft 70, which is rotated in a direction to cause the pinion 69, to engage the cylindrical rack 66, to slidably draw the driving cylinder 65, inwardly thus moving the gear 67, into engagement with the large gears 61, which are thereby rotated as are the small gears 62, which are integral therewith. The gears 61, being in mesh with the large stationary internal gear 60, travel around within the internal gear as they are rotated thereby causing the small gears 62, to rotate the movable internal gear 59, and the wheel gear 58, adjustably locked therewith. The drive is then transmitted to the tube 52, and to the hub 40, and the wheel rim 51 is rotated at a reduced rate of speed caused by the arrangement of the driving gears.

By turning the vertical shaft 70, in an opposite direction from that hereinbefore described, the driving cylinder 65, is moved outwardly from neutral position on the axle 7, so that the gear 67, lockingly engages or meshes with the internal driving gear 64, which is rotated. Rotation of the internal gear 64, causes rotation of the gear 63, and the small gears 62, meshing therewith. The large gears 61, rotate with the gears 62, and travel around the large stationary internal gear 60, whereby the drive is transferred to the internal gear 59, the wheel gear 58, and then to the wheel rim 51. In this case the speed of the drive of the axle 7, is also reduced but at a different rate of speed than that formerly described.

In the modified use of the form of speed change tractor wheel shown in Figure 10, the operation of the wheel mechanisms is the same as that already described. In this case, however, the wheel is equipped with a pulley mechanism connected with the driving cylinder 65, whereby a drive from the axle 7, may be transmitted to the auxiliary axle 71, and to the pulley 74, which may be connected by a belt to drive another device at a direct or changed rate of speed.

Referring to Figure 1, it will be seen that the speed reducing mechanism of the driving wheel is located to the inside of the wheel to permit removal of the wheel without removal of the reducing gear mechanisms. It will of course, be understood that the speed reducing mechanism, may, if desired, be mounted directly within the wheel and still produce the results described.

We are aware that numerous changes may be made, and various details of construction may be varied without departing from the principles of this invention, and we therefore do not purpose limiting the patent granted otherwise than necessitated by the prior art.

We claim as our invention:—

1. A speed change mechanism embracing a driving axle, a speed change wheel, a rack driving cylinder slidably mounted on said axle, means on said rack for connecting the wheel therewith, and pinion means engaged with the rack adapted to slide said rack driving cylinder to move the means thereon into engagement with said speed change wheel, whereby a drive from said axle is changed by said speed change wheel to produce different speed changes depending upon the direction of movement of said rack driving cylinder.

2. A speed change mechanism comprising a driving axle, a driving member slidably mounted thereon, a driving gear integrally formed thereon, a wheel, speed change gears therein, a double gear member comprising an external gear and an internal gear, said external gear being in mesh with certain of said speed change gears, and means for sliding said driving member on said axle to move the driving gear either into engagement with other of the speed change gears to drive the wheel at a reduced rate of speed, or into engagement with said internal gear to drive the wheel at a different reduced rate of speed.

3. A speed change mechanism comprising a driving axle, a speed change wheel connected therewith, an internal gear therein, a cylindrical rack slidable on said axle, and a gear on said cylindrical rack adapted to engage in said internal gear when said rack is shifted to permit said wheel to be driven at different reduced rates of speed from that transmitted by said axle through the said cylindrical rack and the gear thereon.

4. The combination with an automobile and the driving axles thereof, of speed reduction wheels, integrally connected rack and gear members slidably mounted on said axles, and means for sliding said rack and gear members to connect said wheels to said axles to permit a drive from said axles to be reduced by said wheels.

5. The combination with an automobile and the driving axles thereof, of speed reduction wheels, sleeves slidably mounted on said axles, a rack and a gear formed on each of said sleeves, and means engaging said racks for moving the sleeves inwardly or outwardly on said axles to permit a drive from said axles to be transmitted through the gears on said sleeves to said wheels at different rates of speed depending upon the direction of movement of said sleeves.

6. The combination with an automobile and driving axles thereof, of speed change wheels, and one-piece rack and gear driving means slidably mounted on said axles adapted to be moved outwardly and inwardly thereon from a neutral non-driving position to permit a drive from said axles to be transmitted to said wheels through said one-piece rack and gear driving means at different reduced rates of speed.

7. A speed change device embracing a driving axle, a speed change wheel, means movably mounted on said axle, externally operatable mechanism adapted to slide said means in either direction on said axle to engage and drive said wheel at different changed rates of speed, and a pulley mechanism, said means adapted to be moved into position to drive the pulley mechanism.

In testimony whereof we have hereunto subscribed our names in the presence of two subscribing witnesses.

ALBERT E. COOK.
THOMAS VAN TUYL.

Witnesses:
FRANK A. BREMER, Jr.,
FRED E. PAESLER.